United States Patent [19]

Henry

[11] Patent Number: 4,730,413
[45] Date of Patent: Mar. 15, 1988

[54] REMOVABLE AUTOMOBILE SIDE WINDOW

[75] Inventor: Donald J. Henry, New Albany, Pa.

[73] Assignee: Nami Products, Inc., New Albany, Pa.

[21] Appl. No.: 6,166

[22] Filed: Jan. 23, 1987

[51] Int. Cl.⁴ .................................................. B60J 1/08
[52] U.S. Cl. .................................................. 49/48; 49/463
[58] Field of Search ........................... 49/48, 463, 465; 160/105, 116, 180

[56] References Cited

U.S. PATENT DOCUMENTS

| | | | |
|---|---|---|---|
| 1,294,879 | 2/1919 | Davis | 49/48 X |
| 1,388,091 | 8/1921 | Bresnahan | 49/48 |
| 1,721,223 | 7/1929 | Kern | 49/48 |
| 1,909,639 | 5/1933 | Smith et al. | 49/48 |
| 2,061,689 | 11/1936 | Wilson | 49/48 X |
| 2,873,800 | 2/1959 | Kogan | 160/105 X |
| 2,913,780 | 11/1959 | Weisselberg | 49/171 X |
| 3,605,341 | 7/1969 | Puckett | 49/413 |
| 4,398,586 | 8/1983 | Hall | 160/105 |

*Primary Examiner*—Philip C. Kannan
*Attorney, Agent, or Firm*—Thomas Hooker

[57] ABSTRACT

A removable automobile side window includes a transparent window panel with a central cut out opening and a smaller delivery window on the outside of the opening.

16 Claims, 7 Drawing Figures

REMOVABLE AUTOMOBILE SIDE WINDOW

This invention relates to a removable window which may be mounted within the window opening of a conventional car or truck door. The removable window includes a small central delivery window which is rapidly and easily opened and closed to facilitate delivery and pick-up of objects through the window. The removable window is particularly useful for delivery and pick-up of mail by rural route carriers.

U.S. Pat. No. 3,605,341 discloses a removable automobile window fitted within a conventional window opening having a fixed panel and a movable panel which can be slid in a horizontal direction to open and close the window. U.S. Pat. Nos. 1,294,879, 1,388,091, 1,721,223 and 1,909,639 disclose other types of automobile door windows provided with smaller inset windows.

The removable automobile side window of the present invention includes a transparent main window panel fitted within a conventional car door window opening and a smaller central delivery window mounted on the outside of the panel and surrounding a central cut out opening in the panel. The delivery window is confined within channels on the sides of the frame to permit opening and closing of the delivery window by movement in an up and down direction. The delivery window is angled outwardly of the main window so that the top of the delivery window and a roof supported by the top clear the top of the door and adjacent automobile body work when the window is raised. When open, the top and roof normally project above the top of the car. A seal strip forms a weather join between the bottom of the window and the car door.

The main window and the delivery window are formed from the transparent sheet stock to facilitate visibility through the window when installed. The frame is of relatively narrow width and does not materially obstruct vision through the window. A lock enables the user to secure the delivery window in the closed position and lock the vehicle closed against unauthorized entry.

The delivery window is opened and closed more rapidly than a conventional manual or electrically driven car window may be opened or closed. Reduced opening and closing time materially reduces the amount of time required to complete a mail route where the driver must open and close the window repeatedly as mail is delivered to and received from mailboxes spaced along a rural delivery route.

The delivery window is secured to the supporting frame with tight seals thereby permitting opening and closing of the window without a loss of heated or cooled air from the car. The relatively small area of the delivery window reduces the risk of rain or snow entering the car when the window is opened in inclement weather.

Other objects and features of the invention will become apparent as the description proceeds, especially when taken in conjunction with the accompanying drawings illustrating one embodiment of the invention.

Figure 1:
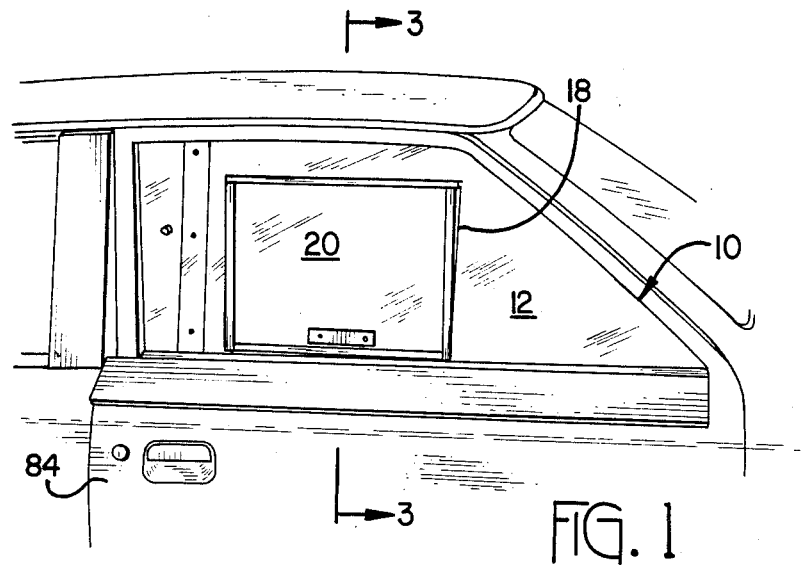
FIG. 1 is a side view of the passenger door of an automobile with a removable side window installed and with the smaller delivery window closed.
Figure 2:
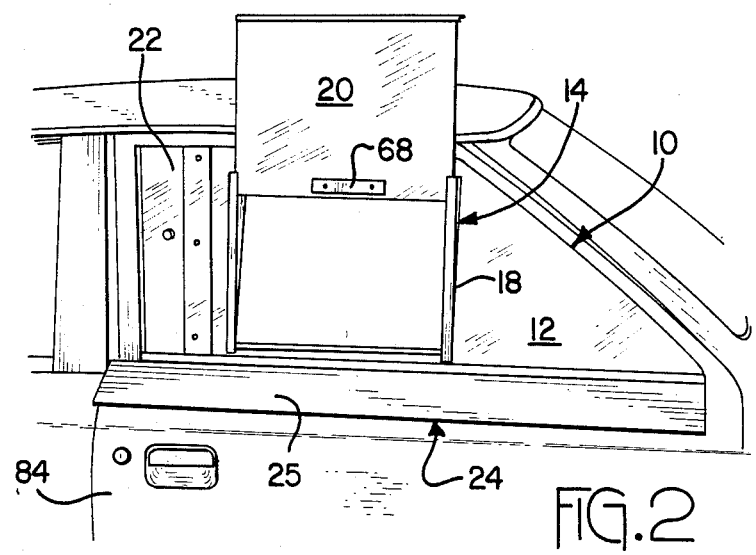
FIG. 2 is a view like FIG. 1 with the delivery window open.
Figure 6:
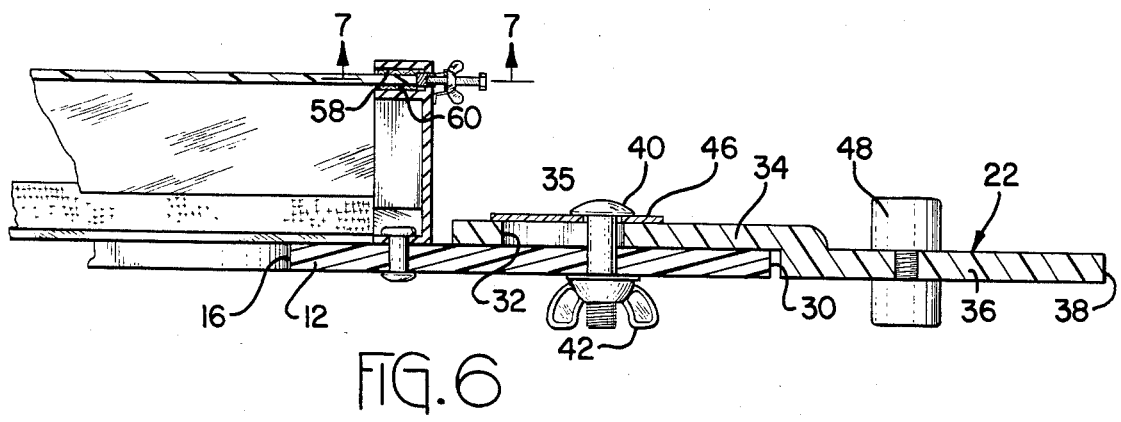
FIG. 6 is a sectional view taken along line 6—6 of FIG. 4.
Figure 7:
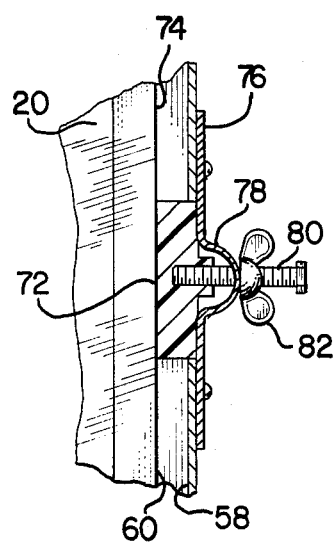
FIG. 7 is a sectional view taken along line 7—7 of FIG. 6.

Removable automobile side window 10 includes a main window panel 12 formed from a sheet of transparent acrylite plastic and a rectangular delivery window assembly 14 mounted on the exterior surface of panel 12 and surrounding rectangular cut-out opening 16 in the panel. The delivery window panel assembly includes a rectangular metal frame 18 which supports a rectangular delivery window 20 also formed from a sheet of transparent acrylite plastic. An extension panel 22 is secured to the rear of the main window panel 12 to facilitate mounting the window 10 in conventional window opening. Rubber sealing strip 24 is secured to the lower edge of the main panel for forming a weather tight seal with the outside of the car door below the panel as shown in FIGS. 1 and 2.

Figure 4:
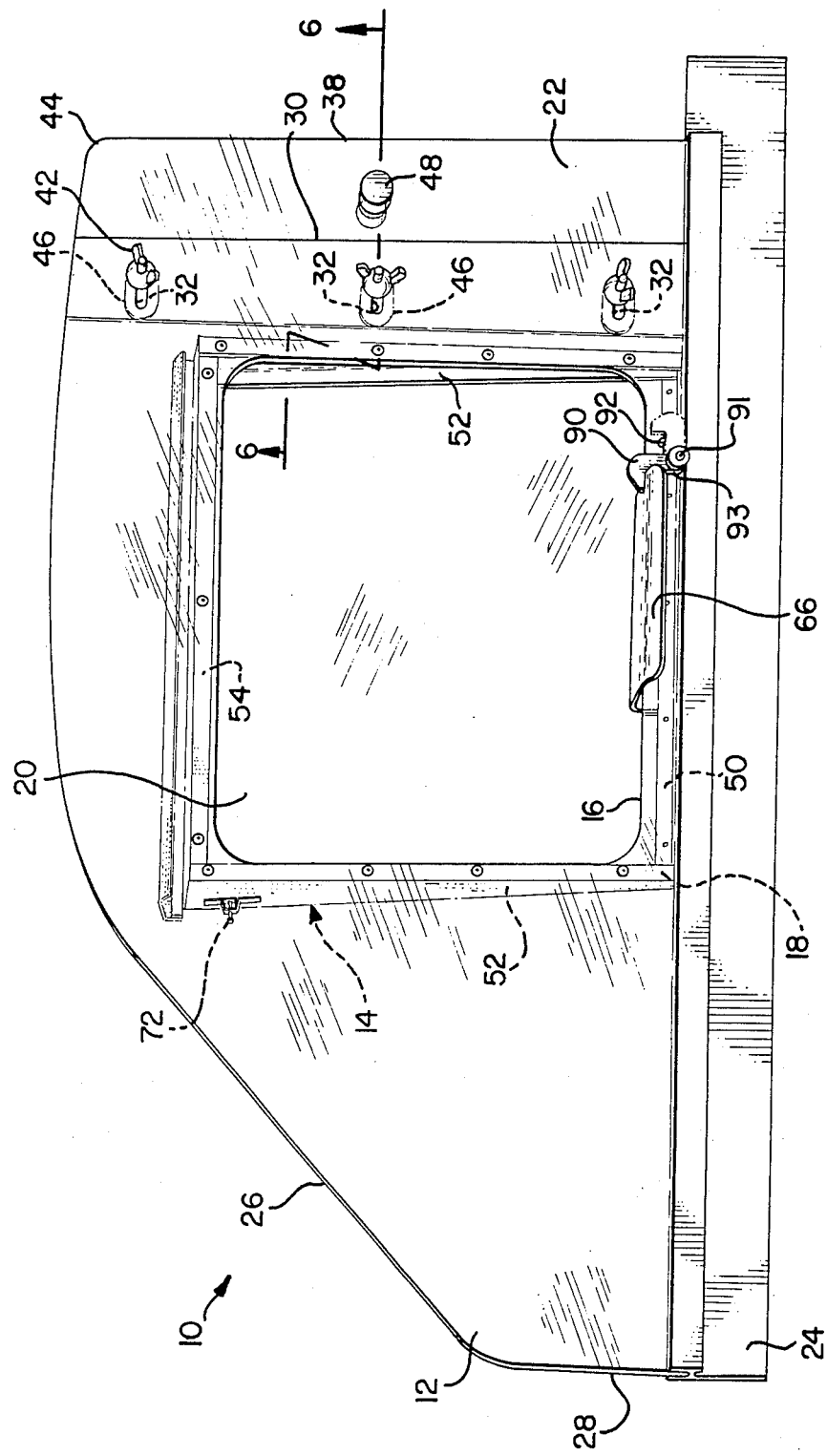
FIG. 4 is a view of the interior of the side window showing the delivery window down and FIG. 5 is a similar view showing the delivery window open.
Figure 5:
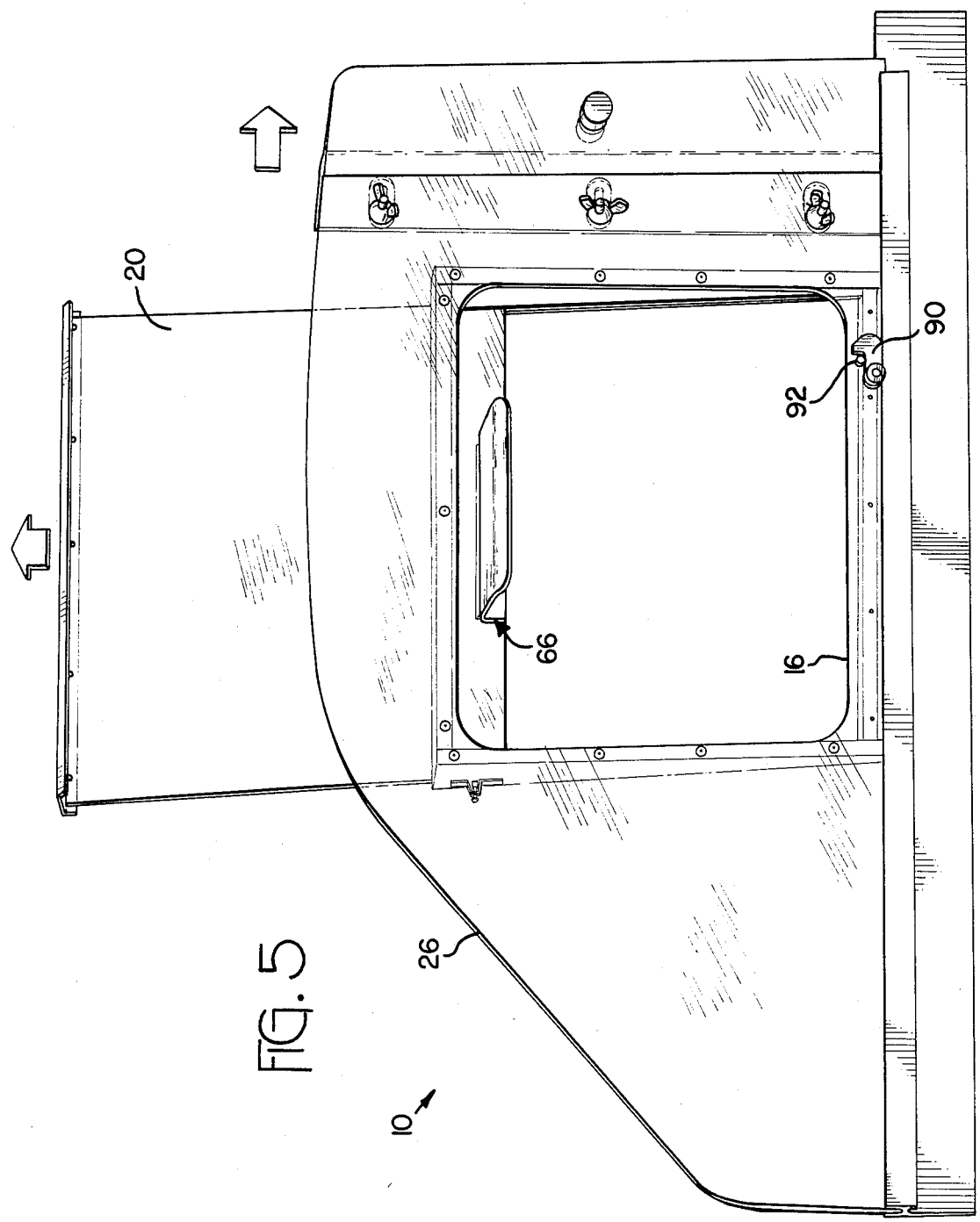

As illustrated in FIGS. 4 and 5, the main window panel includes an upper edge 26 having a shape identical to the window-receiving track of the opening into which the removable window 10 is installed. Edge 26 extends from the forward panel end 28 to straight rear panel edge 30 located forwardly of the rear of the window opening. If necessary the panel 12 may be curved inwardly from top to bottom to accommodate fitting of the window to replace curved side windows.

The extension panel 22, also formed from transparent acrylite plastic, includes stepped or offset portion 34 overlying the exterior surface of panel 12 and a continuation portion 36 forming an extension of the panel 12 beyond rear edge 30. A plurality of elongated slots 32 are formed through portion 34. The outer edge 38 of the continuation portion 36 conforms to the shape of the window recess receiving the window 10. A plurality of bolts 40 extend through slots 32 in portion 34 and holes 35 in panel 12 adjacent edge 30 so that adjustable wing nuts on the interior of the side window may be tightened to hold the extension panel 22 in proper position on the main panel 12 with the upper edge 26, edge 44 of the extension panel and the outer edge 38 of the panel having the same shape as the shape of the edge of the conventional window replaced by window 10. Bolts 40 extend through thin, long washers 46 which overlie the slots 32 to form weather seals. A handle 43 extends outwardly from both sides of the extension panel 22. Portion 34 is cut away above the sealing strip 24.

Figure 3:
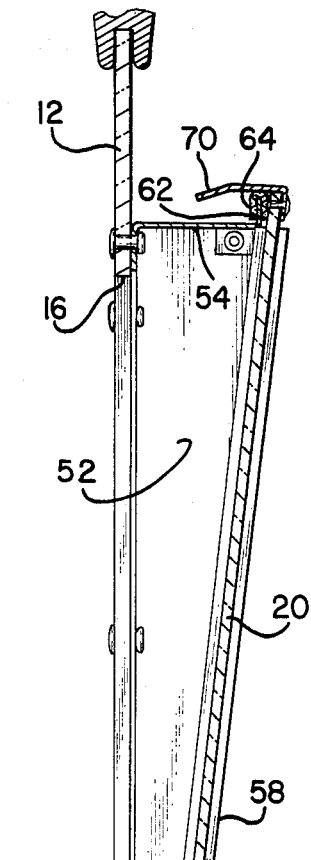
FIG. 3 is a sectional view taken along line 3—3 of FIG. 1.
Figure 3:
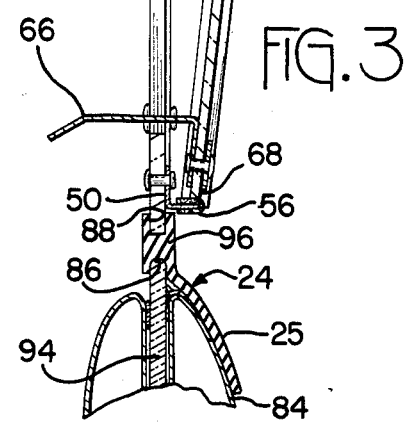

The rectangular metal frame 18 extends around cut out opening 16 and includes a bottom frame member 50, two like side frame members 52 and a top frame member 54 attached to the outer surface of panel 12 adjacent the bottom, side and top edges of the opening 16. The bottom frame member 50 is attached to the panel 12 a short distance below the bottom edge of the cut out as illustrated in FIG. 3. All of the members 50, 52 and 54 are formed from anodized aluminum sheeting and project outwardly of the window panel 12. A U-shaped section 56 of felt sealing material is attached to the wall of bottom member 50 and extends along the bottom of the opening 16. The wall of the top member 54 extends a distance outwardly from the panel 12 beyond the bottom frame member as shown in FIG. 3. The height of the side frame members 52 increases from the bottom to the top of the opening to join the ends of the bottom and top members, as shown in FIG. 3.

The side frame members each include a channel 58 facing toward opening 16 and extending along the members from seal 56 to the outer edge of the top member 54. Lengths of U-shaped felt seal 60 are seated within channels 58. A vertical flange 62 extends along the outer edge of the top member 54 between the side members at the inner edges of channels 58. A length of U-shaped felt weather seal is fitted on flange 62.

The delivery window 20 is fitted in channels 58 with its side edges having a tight sliding fit within the seals 60 so that the window may be raised or lowered as required while retaining a weather seal with frame 18. L-shaped delivery window handle 66 and backing plate 68 are riveted to the lower edge of the window 20 as shown in FIG. 3. The free end of the handle extends inwardly through opening 16 to facilitate opening and closing of the delivery window.

A roof 70 is mounted on the top edge of the window 20 and extends toward panel 12 above flange 62. When window 20 is closed the lower edge of the window tightly engages the seal 56 on the bottom frame member 50 and roof 70 rests on the seal 64 extending along the top frame member, thereby, in cooperation with the seals between the side edges of the panel and the seals in channels 58, forming a tight weather-proof seal between window 20 and frame 18. The inner lip of roof 70 is bent downwardly adjacent the top frame member 54 to aid in preventing rain from leaking past seal 64.

The side members 52 are each provided with a friction a block 72 engagable with the side edges 74 of the window 20 in channels 58 to assure that the window 20 is frictionally retained in a desired position. The blocks may be formed from nylon. Each block 72 is positioned in the cut out in a channel 58 and rests on the adjacent window edge 74. Spring member 76 is secured to the outside of the side frame member on both sides of the cut out and includes an outwardly bowed spring 78 located over the block 72. An adjustment screw 80 extends through and threadably engages the spring 78. The end of the screw is freely seated in a hole in the block 72. The block is biased into frictional engagement with the window edge 74 by tightening the screw. The screw is locked in place by tightening wing nut 82 against the spring 78.

The flap seal 24 is formed from resilient rubber material and includes lower and upper grooves 86 and 88 and a flap 25 extending from one side of groove 86. The bottom edge of panel 12 is fitted in groove 88.

The removable window is provided with a positive lock which holds the delivery window 20 in the down position and enables a vehicle with the window installed to be locked closed. The lock includes a hook 90 pivotedly mounted on a pin 91 extending from the bottom frame member. A spring 93 biases the hook in a clockwise direction as illustrated in FIGS. 4 and 5. A keeper pin 92 extends from the window 12 on the side of the hook away from handle 66. The hook may be confined in an open position by pulling it outwardly on its supporting pin and then latching it behind pin 92 as shown in FIG. 5. When in this position the window may be freely opened and closed. FIG. 4 illustrates the hook in the locked position. The hook is moved outwardly on its support pin from the position of FIG. 3 and pivoted in a counter-clockwise direction to engage the handle. Following this, the hook is moved inwardly toward the window and is thereby confined in a locked position between the handle and pin 92.

The main panel 12 and extension panel 22 are shaped to fit within the window opening of a passenger window for a particular vehicle. The side window 10 is installed within the opening by first completely lowering the conventional window, loosening nuts 42 and sliding the panel 22 fully toward the main panel 12 and then moving the main and extension panels into the window opening from outside of the car door to seat the upper edges 26 and 44 within the top window track in the door which normally receives the top edge of the conventional window when rolled up. The window 10 is then moved forwardly and upwardly to assure proper seating within the track. During installation the flap 25 is bent out and engages the exterior of the car door as shown in FIGS. 1, 2 and 3.

Following proper seating of the main window panel 12 the extension panel is moved rearwardly to seat rear edge 38 in the rear track of the conventional window opening. Wing nuts 42 are then tightened to secure extension panel 22 to main panel 12. As illustrated in FIGS. 1 and 2, the flap 25 of seal 24 extends rearwardly beyond the panel 22 to the door edge to provide a tight weather proof seal between the door and the bottom of the window 10.

Following positioning of the two panels 12 and 22 within the window opening the conventional window 94 is raised so that its top edge seats within the bottom groove 86 of flap seal 24. Raising the window 94 holds the side window 10 in place within the door. The portion 96 of the flap seal captured between the windows 10 and 94 forms a resilient cushion or gasket that facilitates contact between the curved top edge of window 94 and the straight bottom edge of panel 12. The flap 25 forms weather seal between the bottom of panel 12 and car door 84.

With window 10 in place and blocks 72 properly adjusted the driver may easily open and close the delivery window 20 by moving handle 66 up and down as required. The blocks 72 and frictional engagement with the seals in channels 58 hold the delivery window in the raised or lowered position as required. When open, window 20 and roof 70 project above the top of the car.

The delivery window 20 is angled outwardly from the main window panel 12 to assure that it and roof 70 clear the top of the door and overlying body trim. This feature is important when the window 10 is installed in car doors in which the top of the window and body trim project outwardly of the window recess. Also, the outwardly sloping window assures that there is space for inwardly extending roof 70. The outwardly sloping window also tends to reduce the amount of rain, snow and ice which normally collects on the outside of window 20.

The removable automobile side window 10 may be used in vehicles driven by rural route mail carriers. Carriers are required to drive a relatively long mail route and to deliver and receive mail from mailboxes located along the route. The rapid opening and closing capability of the delivery window combined with its relative small area as compared with the full area of the conventional window permit the carrier to open and close the window at each mailbox while retaining heated or cooled air in the vehicle while keeping inclement weather outside the vehicle.

The speed with which the delivery window is opened and closed appreciably reduces the amount of time required to complete the mail route. In some cases with long mail routes, this feature may be opened and closed may reduce the time required to service a mail route by as much as fifteen minutes.

The delivery window is fully opened when the handle engages the top of the cut out opening. This engagement retains the delivery window in the frame. See FIG. 5 where the hndle is just below the top of the cut out. The drag blocks 72 are located adjacent the tops of the channels 58 and hold the edges of the open delivery window.

The window is easily installed and removed as required thereby permitting a vehicle used for delivery mail to be used for everyday purposes with the conventional window in place.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A removable automobile side window comprising:
   a. A transparent main window panel having:
      1. A central cut-out opening,
      2. A curved top edge conforming to the shape of an automobile door window opening and
      3. A bottom edge;
   b. A frame mounted on the outer surface of the main panel surrounding the cut-out opening inwardly of the edges of the main panel, said frame having a pair of opposed parallel channels, said channels
      1. Facing each other,
      2. Extending along opposite sides of the cut-out opening, and
      3. Being spaced outwardly of the main panel;
   c. A transparent delivery window mounted in the frame having:
      1. Opposed parallel edges movably seated in said frame channels, and
      2. Top and bottom edges overlying corresponding portions of the frame when the delivery window is closed
   d. A handle mounted on the interior side of the delivery window adjacent the bottom of the delivery window and extending inwardly therefrom; and
   e. Weather seal means forming weather-tight seal between the periphery of the delivery window when closed and the periphery of the frame;
   f. Whereby the delivery window may be opened and closed by moving the handle in directions parallel to said edges, said handle extending inwardly from the delivery window sufficiently to engage part of the side window to prevent movement of the delivery window beyond the channels when open.

2. A window as in claim 1 wherein said panels lie in vertical planes, the delivery window is moved up and down between opened and closed positions and including a roof extending along the top edge of the delivery window away from the handle, said roof overlying the adjacent portion of the frame.

3. A window as in claim 2 wherein the channels extend away from the main panel so that the bottom of the delivery window when closed is closer to the main panel than the top of the delivery window.

4. A window as in claim 3 including friction means mounted in said frame and engaging the delivery window for holding the delivery window in a fixed open position relative to the frame.

5. A window as in claim 1 including sealing means on the bottom edge of the main panel for forming a weather seal with the outer surface of an automobile door below an opening receiving said removable automobile side window.

6. A window as in claim 5 wherein said sealing means includes a resilient gasket running along the length of said bottom edge engagable with the top of a window in an automobile door to hold said side window in place.

7. A window as in claim 6 wherein said sealing means includes a resilient flap overlying the outer surface of an automobile door and extending along the length of the main panel.

8. A window as in claim 1 including a removable extension panel mounted on the rear edge of the main panel, the exterior edges of said extension panel conforming to the shape of the rear portion of the automobile door window opening.

9. A window as in claim 8 including adjustment means for mounting said extension panel to said main panel.

10. A removable automobile side window comprising:
    a. A transparent main window panel having:
       1. A rectangular central cut-out opening,
       2. A curved top edge conforming to the shape of an automobile door window opening and
       3. A bottom edge;
    b. A rectangular frame mounted on the outer surface of the main panel surrounding the cut-out opening inwardly of the edges of the main panel, said frame having a pair of opposed straight and parallel channels, said channels:
       1. Facing each other,
       2. Extending along opposite sides of the cut-out opening in vertical planes, and
       3. Angling outwardly of the main panel from the bottom of the opening to the top of the opening;
    c. A flat, rectangular and transparent delivery window mounted in the frame having:
       1. Opposed parallel edges movably seated in said frame channels, and
       2. Top and bottom edges overlying corresponding portions of the frame when the delivery window is closed;
    d. Weather seal means forming weather-tight seal between the periphery of the delivery window when closed and the periphery of the frame; and
    e. A roof on the top edge of the delivery window overlying the top portion of the frame when the delivery window is closed;
    f. Whereby the delivery window extends outwardly of the main panel when opened to clear adjacent parts of the automobile.

11. A window as in claim 10 including friction means mounted in said frame and engaging the delivery window for holding the delivery window in a fixed open position relative to the frame.

12. A window as in claim 10 including sealing means on the bottom edge of the main panel for forming a weather seal with the outer surface of an automobile door below an opening receiving said removable automobile side window.

13. A window as in claim 12 wherein said sealing means includes a resilient gasket running along the length of said bottom edge engagable with the top of a window in an automobile door to hold said side window in place.

14. A window as in claim 13 wherein said sealing means includes a resilient flap overlying the outer surface of an automobile door and extending along the length of the main panel.

15. A window as in claim 10 including a removable extension panel mounted on the rear edge of the main panel, the exterior edges of said extension panel conforming to the shape of the rear portion of the automobile door window opening.

16. A window as in claim 15 including adjustment means for mounting said extension panel to said main panel.

* * * * *